United States Patent
Salmonsen et al.

(10) Patent No.: US 9,745,472 B2
(45) Date of Patent: Aug. 29, 2017

(54) ASPHALT RECYCLING METHOD

(71) Applicants: Steven Salmonsen, Rye, NH (US); Joe Proctor, Golden, CO (US)

(72) Inventors: Steven Salmonsen, Rye, NH (US); Joe Proctor, Golden, CO (US)

(73) Assignee: PRE TECH INDUSTRIES, INC., Rye, NH (US)

( * ) Notice: Subject to any disclaimer, the term of this patent is extended or adjusted under 35 U.S.C. 154(b) by 0 days.

(21) Appl. No.: 14/803,052

(22) Filed: Jul. 18, 2015

(65) Prior Publication Data
US 2017/0015827 A1  Jan. 19, 2017

Related U.S. Application Data

(60) Provisional application No. 62/026,622, filed on Jul. 19, 2014.

(51) Int. Cl.
| | |
|---|---|
| *C08L 95/00* | (2006.01) |
| *C08K 3/00* | (2006.01) |
| *C08K 5/053* | (2006.01) |
| *C08K 5/17* | (2006.01) |
| *C08J 11/00* | (2006.01) |

(52) U.S. Cl.
CPC ............... *C08L 95/00* (2013.01); *C08J 11/00* (2013.01); *C08K 3/0033* (2013.01); *C08K 5/053* (2013.01); *C08K 5/17* (2013.01); *C08J 2395/00* (2013.01); *C08L 2555/34* (2013.01); *C08L 2555/60* (2013.01)

(58) Field of Classification Search
CPC .. C08L 95/00; C08J 9/00; C08J 9/0004; C08J 9/0023; C08J 9/0028; C08J 11/00; C08J 2395/00; C08K 5/052; C08K 5/17; C09D 195/00; C10C 3/00
See application file for complete search history.

(56) References Cited

U.S. PATENT DOCUMENTS

| | | | | |
|---|---|---|---|---|
| 2011/0034593 | A1* | 2/2011 | Gonzalez Leon | C04B 26/26 524/59 |
| 2012/0167802 | A1* | 7/2012 | Huh | C04B 26/26 106/669 |
| 2013/0276668 | A1* | 10/2013 | Ranka | C08L 95/005 106/122 |

* cited by examiner

*Primary Examiner* — Jennifer A Smith
*Assistant Examiner* — Alexandra M Moore
(74) *Attorney, Agent, or Firm* — Gerald K. White

(57) ABSTRACT

An asphalt paving mixture comprising aggregate; liquid asphalt; recycled asphalt material in an amount greater than 10% by weight of said mixture; and an amount from about 0.5% to about 20%, by weight of said liquid asphalt of a recycled asphalt pavement rejuvenating additive, said additive comprising a mixture of amine and glycol is used to form pavement. Incorporation of the recycled asphalt pavement rejuvenating additive permits higher amounts of recycled asphalt material in the mixture to be used to form pavement.

2 Claims, No Drawings

ASPHALT RECYCLING METHOD

This patent application claims priority under 35 U.S.C. 119(e) from U.S. provisional patent application Ser. No. 62/026,622, filed Jul. 19, 2014, entitled Improved Asphalt Recycling Method, and incorporated herein by reference in its entirety.

FIELD OF INVENTION

The present invention is directed to a technique for increasing the amount of recycled asphalt material that can be included into a mixture of aggregate, liquid asphalt, and recycled asphalt materials and yet produce a durable, useful paved surface. This inventive result is obtained through the incorporation of a recycled asphalt pavement rejuvenating additive into the mixture.

BACKGROUND OF THE INVENTION

Historically, for roads constructed of liquid asphalt cement and aggregate, the standard composition of the mixture ranges from 94% to 96% aggregate, with the remaining percentage being liquid asphalt binder. Over the years, various chemical additives have been introduced to the standard composition to improve the durability and lifespan of the road. Over time, with improved road performance, the desire to include recycled materials gained support from government agencies and environmentalists. Recycled materials have included recycled asphalt pavement (referred to as "RAP"), recycled asphalt shingles (referred to as "RAS"), recycled tire rubber, and recycled glass bottles. The concept behind recycling is to reuse or recycle materials; however, recycled materials tend to negatively impact the durability and lifespan of the road. The present invention is directed to addressing this problem and thereby achieving highly desirable cost and environmental benefits, such as reducing landfills.

Various asphalt material recycling methods are known in the art and are illustrated in the following U.S. patent documents: Published Patent Application Numbers 2011/0015313 and 20112/0167802 and U.S. Pat. Nos. 8,663,378; 8,679,345; and 8,734,581.

SUMMARY OF THE INVENTION

The present invention involves an asphalt paving mixture comprising aggregate; liquid asphalt; recycled asphalt material in an amount greater than 10% by weight of said mixture; and an amount from about 0.5% to about 20%, by weight of said liquid asphalt of a recycled asphalt pavement rejuvenating additive, said additive comprising a mixture of amine and glycol.

The present invention also includes a method for foaming asphalt pavement comprised of a foamed liquid asphalt, a heated mixture of aggregate; recycled asphalt material in an amount greater than 10% by weight of said mixture; and an amount from about 0.5% to about 20%, by weight of said liquid asphalt of a recycled asphalt pavement rejuvenating additive, said additive comprising a mixture of amine and glycol; placing said heated mixture on a surface; cooling said mixture; and shaping said mixture to form an asphalt pavement of desired dimensions.

DETAILED DESCRIPTION OF THE INVENTION

Generally roadway paving with asphalt compositions is typically conducted by heating mixture of aggregate and liquid asphalt in a mixing drum or other suitable container at a typical temperature range of about 300 to about 350° F., placing such mixture on a road or the like for cooling, and then shaping the cooled mixture to desired dimensions to form pavement. The inventive process modifies such process by including recycled asphalt materials to the mixture. The amount of such recycled materials in such generalized process has been limited to about 10% maximum because the recycled asphalt material is aged and oxidized and becomes very dry and stiff. Because of such condition, the finished asphalt paving mixture of aggregate and liquid asphalt is too stiff to work and to compact. By the addition of a recycled asphalt pavement rejuvenating additive to the mixture, it has been possible overcome this problem and to use up to 40/50% recycled material in the mixtures. Thus, the amount of recycled materials that can be used in the process ranges from greater than 10% to about 50%.

The present invention involves an asphalt paving mixture comprising aggregate; liquid asphalt; recycled asphalt material in an amount greater than 10% by weight of said mixture; and an amount from about 0.5% to about 20%, by weight of the liquid asphalt of a recycled asphalt pavement rejuvenating additive comprising a mixture of amine and glycol.

The aggregate and liquid asphalt portions of the mixture are those conventionally used in the industry and need no further description. Typically, aggregate constitutes about 94% to about 96% and liquid asphalt about 4% to about 6% of the mixture.

One of the largest recycled asphalt materials available is RAP, which is the material that is machined or milled from older roads in need of a new surface layer. The amount of RAP that can be used in a new asphalt mix has been limited to less than 10% because the older pavement has been exposed for years to many environmental conditions, including direct sunlight, which causes the old asphalt to oxidize and become dry and brittle. When too much recycled material is added to a new asphalt mix, the new mix becomes too stiff and not sufficiently workable to be placed upon a desired surface and then compacted. The present invention improves and solves this problem. For purposes of the invention, the term "asphalt material" includes RAP; RAS; recycled rubber, such as tire rubber, recycled glass bottles, and admixtures of two or more of these recycled materials.

The asphalt paving mixture of the present invention includes a recycled asphalt pavement rejuvenating additive that comprises a mixture of amine and glycol. This additive permits a greater amount of recycled asphalt material to be incorporated into the mixture and then ultimately formed into pavement than if such additive was not added to the mixture. The benefits and advantages of the present invention not only include increasing the percentage of RAP or RAS that can be used in the mix, but also includes obtaining increased adhesion of the aggregate and asphalt which improves the tensile strength ratio of the mix and its useful lifespan.

Amines useful in the practice of the invention include, but are not limited to, ethanol amines, polyamines, diamines, polyalkylene glycol mixture, alkyloxylated aliphatic polyamines, alkyl amines, dihexylamine, alkoxylated fatty polyamines, modified fatty amidoamine, and the like.

Glycols are added to amines to form an amine/glycol additive. The addition of glycols serves to reduce the viscosity of the amines and thus to facilitate incorporation into the mixture by rendering the amines easier to pump and add to the asphalt mixture. The additive chemically reacts with liquid asphalt and is believed to at least partially rejuvenate the oxidized asphalt. The additive also has a polar bonding reaction that assists the liquid asphalt cement and aggregate to bond.

Useful glycols include, but are not limited to, propylene glycols, ethylene glycols, ether glycols, and the like. An amount from about 0.5% to about 20%, by weight of liquid asphalt of the recycled asphalt pavement rejuvenating additive is useful to obtain the benefits of the invention, Such range provides the desired inventive results and no advantage is obtained by markedly exceeding the upper range.

The amine content of suitable mixtures may range from about 10% to 90% by weight of the mixture and the glycol content likewise may range from about 10% to 90% by weight of the mixture.

The amine and glycol additive mixture may be added to the mixer at a preferred temperature range of about 200° F. to 380° F. and is able to withstand such heat. At temperatures less than about 200° F., liquid asphalt does not flow sufficiently. When processing recycled ground tire rubber, temperatures as high as about 440° F. may be required. Accordingly, a temperature range on the order of about 200° F. to 450° F. is generally contemplated for use in the present invention.

Using other additives in the mix helps to rejuvenate the RAP/RAS in the new mix and make it more pliable. A number of chemical additives were considered, but had drawbacks. For example, various oils or fatty acids serve to soften the RAP/RAS, but the mix remains soft so that the final composition mix is too soft to then set up and become a strong, durable product. On the other hand, additives comprised of amines and glycols mixtures will help rejuvenate the RAP/RAS and to achieve higher RAP usages of up to 50% and yet permit the final mix to set up, cure, and become a durable final product. The amine and glycol mixture additive has the additional benefit of improving the tensile strength of the paving thereby making the formed pavement more durable and increasing the lifespan of the road.

The amine and glycol mixture additive is be readily incorporated into the liquid asphalt cement in amounts ranging from 0.5% to 20% additive, based upon the weight of the liquid asphalt cement. Should about 10% of recycled material be used, the additive need only be added in an amount of about 0.5% to about 5.0%. When using higher amounts of recycled material, for example 20% to 50%, about 10% to about 20% additive should be used. Another factor to be considered in the selection of the amount of additive is that when older, drier recycled material is used, stiffness is increased. As stiffness is increased, higher amounts of additive are required.

Following incorporation of the additive, the treated liquid asphalt cement is mixed in an asphalt plant in a drum mixer or other suitable container along with virgin aggregate and RAP and/or RAS. This mixture is removed from the mixing drum and is then loaded into trucks and transported to a paving site where it is spread and compacted. Of course, the amine glycol mixture additive may be directly and independently added to the mixture instead of being incorporated into the liquid asphalt cement or both addition techniques followed together.

When using recycled asphalt materials in a mix it has been noted that the end mixture is too stiff to properly laydown the material on the roadbed and then compact it. Using the described recycled asphalt pavement rejuvenating additive aids in softening the mixture and thus allowing it to be easily placed and then compacted. This is accomplished by reducing the lower temperature end of the asphalt which can be shown by testing to show how the low end of the temperature is reduced or also presented in the industry accepted test for performance grade changes.

Table 1 below outlines testing conducted to show changes in the creep stiffness of the material. The results show that the creep stiffness value change provides a grade change on the low end of the temperature range which results in a reduction from a −22° Celsius to a −28° Celsius. The creep stiffness maintaining a value of 0.300 or greater leads to this determination.

TABLE 1

Sample Conoco-Phillips66 76-22 w/10% ReRAP3
The sample was identified as Conoco-Phillips66 76-22 w/10% ReRAP3.
The binder sample was tested in accordance with testing
methodologies specified in the AASHTO M320 table.
The results are as follows:

| Sample #: | Sample Conoco-Phillips66 76-22 w/10% ReRAP3 |
|---|---|
| Flash Point (AASHTO T48) (° C.): | N/A |
| Rotational Viscosity (AASHTO T316) (Pa * s) (135° C.): | 1.290 |
| Original DSR (AASHTO T315) ($G^*/\sin(\delta)$) (kPa) (76° C.): | 1.36 |
| Original DSR (AASHTO T1315) ($G^*/\sin(\delta)$) (kPa) (82° C.): | 0.796 |
| % Mass Change (AASHTO T240): | −7.124 |
| RTFO DSR (AASHTO T315) ($G^*/\sin(\delta)$) (kPa) (76° C.): | 2.46 |
| RTFO DSR (AASHTO T315) ($G^*/\sin(\delta)$) (kPa) (82° C.): | 1.41 |
| PAV DSR (AASHTO T315) ($G^*/\sin(\delta)$) (kPa) (19° C.): | 5560 |
| PAV DSR (AASHTO T315) ($G^*/\sin(\delta)$) (kPa) (22° C.): | 3790 |
| Creep Stiffness (AASHTO T313) (MPa) (−12° C.): | 113 |
| m-value (AASHTO T313) (−12° C.): | 0.351 |
| Creep Stiffness (AASHTO T313) (MPa) (−18° C.): | 241 |
| m-value (AASHTO T313) (−18° C.): | 0.300 |

Testing shown in Table 2 below indicates softening or a reduction in the lower end temperature where the value reduces from the original −22 degrees Celsius to −25.6 degrees Celsius which constitutes an overall reduction of 16%. Such significant reduction or softening assists the introduction of stiffer recycled materials in the mixture.

TABLE 2

Test Report
Binder Grade Determination AASHTO M320
Sample Description
10% RE-RAP 3
90% Suncor PG 64-22
(PG High 65.6, PG Low −25.6)

| Test Parameter | UOM | Test Method | PG Min | PG Max | Test Temp | Result |
|---|---|---|---|---|---|---|
| Flash Point, COC | (° C.) | T 48 | 230° C. | — | — | 207* |
| Rotational Viscosity | (Pa · s) | T 316 | — | 3 | 135° C. | 0.408 |

TABLE 2-continued

Test Report
Binder Grade Determination AASHTO M320
Sample Description
10% RE-RAP 3
90% Suncor PG 64-22
(PG High 65.6, PG Low −25.6)

| Test Parameter | UOM | Test Method | PG Min | PG Max | Test Temp | Result |
|---|---|---|---|---|---|---|
| Dynamic Shear, G*/sin δ @ 10 rad/s | (kPa) | T 315 | 1.00 | — | 64° C. | 1.21 |
| | | | | | 70° C. | 0.59 |
| Tests on Residue from Rolling Thin Film Over, AASHTO T240 | | | | | | |
| Mass Change | (wt %) | T 240 | — | 1.00 | 163° C. | −7.296* |
| Dynamic Shear, G*/sin δ @ 10 rad/s | (kPa) | T 315 | 2.20 | — | 64° C. | 2.62 |
| | | | | | 70° C. | 1.22 |
| Tests on Residue from Pressure Aging Vessel, AASHTO R-28 PAV Test Temperature = 100° C. | | | | | | |
| Dynamic Shear, G*sin δ @ 10 rad/s | (kPa) | T 315 | — | 5,000 | 25° C. | 3,000 |
| | | | | | 22° C. | 4,510 |
| | | | | | 19° C. | 6,610 |
| Creep Stiffness (BBR) | | | | | | |
| "S-value" @ 60 s | (Mpa) | T 313 | — | 300 | −12° C. | 181 |
| | | | | | −18° C. | 380 |
| "m-value" @ 60 s | — | T 313 | 0.300 | — | −12° C. | 0.340 |
| | | | | | −18° C. | 0.283 |

*Denotes deviation from specification
The test results indicated in this report were obtained from selected samples of this product. Actual test results for any particular batch may vary from the indicated test results obtained for this Test Report.

The two different above tests demonstrate that a significant reduction in the low end temperature range is accomplished using the recycled asphalt pavement rejuvenating additive.

The invention claimed is:

1. An asphalt paving mixture comprising aggregate; liquid asphalt; recycled asphalt material in an amount greater than 10% by weight of said mixture; and an amount from about 0.5% to about 20%, by weight of said asphalt paving mixture of a recycled asphalt pavement rejuvenating additive which reduces the lower end temperature and softens said asphalt paving mixture and results in a creep stiffness value of 0.300 or higher thereby assisting introduction of stiff recycled asphalt material into the asphalt paving mixture and permitting a greater amount of recycled asphalt material than can be included in the asphalt paving mixture if said additive is not added to the mixture, said additive comprising a mixture of an amine selected from the group consisting of ethanol amines, polyamines, diamines, polyalkylene glycol mixture, alkyloxylated aliphatic polyamines, alkyl amines, dihexylamine, alkoxylated fatty polyamines, and modified fatty amidoamine and a glycol selected from the group consisting of propylene glycols, ethelene glycols, and ether glycols wherein said additive comprises from about 10% to about 90% of amine by weight of the rejuvenating additive and from about 10% to about 90% of glycol by weight of the rejuvenating additive.

2. A method for forming an asphalt pavement comprising:
   a. Providing a heated asphalt paving mixture comprising aggregate; liquid asphalt; recycled asphalt material in an amount greater than 10% by weight of said mixture; and an amount from about 0.5% to about 20%, by weight of said asphalt paving mixture of a recycled asphalt pavement rejuvenating additive which reduces the lower end temperature and softens said asphalt paving mixture and results is a creep stiffness value of 0.300 or higher thereby assisting introduction of stiff recycled asphalt material into the asphalt paving mixture and permitting a greater amount of recycled asphalt material than can be included in the asphalt paving mixture if said additive is not added to the mixture, said additive comprising a mixture of an amine selected from the group consisting of ethanol amines, polyamines, diamines, polyalkylene glycol mixture, alkyloxylated aliphatic polyamines, alkyl amines, dihexylamine, alkloxylated fatty polyamines, and modified fatty amidoamine and a glycol selected from the group consisting of propylene glycols, ethelene glycols, and ether glycols wherein said additive comprises from about 10% to about 90% of amine by weight of the rejuvenating additive and from about 10% to about 90% of glycol by weight of the rejuvenating additive mixture of amine and glycol;
   b. Placing said heated asphalt paving mixture on a surface;
   c. Cooling said heated asphalt paving mixture; and
   d. Shaping said heated asphalt paving mixture to form an asphalt pavement of desired dimensions.

* * * * *